United States Patent
Yoshida

(10) Patent No.: US 6,339,628 B1
(45) Date of Patent: Jan. 15, 2002

(54) PAYLOAD RELATIVE POSITION CHANGE REQUESTING APPARATUS AND TRANSMISSION APPARATUS CONTAINING THE SAME

(75) Inventor: Hiroshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/198,200

(22) Filed: Nov. 23, 1998

(30) Foreign Application Priority Data

Mar. 18, 1998 (JP) .......................................... 10-068713

(51) Int. Cl.[7] ................................................. H03D 3/24
(52) U.S. Cl. ........................ 375/376; 375/363; 370/506; 370/907
(58) Field of Search ................................. 375/376, 363, 375/371; 370/505, 516, 506, 509, 907

(56) References Cited

U.S. PATENT DOCUMENTS 5,361,263 A * 11/1994 Urbansky ................... 370/505
5,768,282 A * 6/1998 Ohara et al. ................ 370/506
6,011,802 A * 1/2000 Norman ...................... 370/466

FOREIGN PATENT DOCUMENTS

| EP | 492 549 | 7/1992 |
| EP | 507 385 | 10/1992 |

* cited by examiner

*Primary Examiner*—Chi Pham
*Assistant Examiner*—Phuong Phu
(74) *Attorney, Agent, or Firm*—Rosenman & Colin LLP

(57) ABSTRACT

Pointer action in an SDH transmission apparatus is performed in a temporally evenly dispersed manner. Timings of a received VC-4 clock and a transmit VC-4 clock, whose portions corresponding to overhead are inhibited in a clustered fashion, are evened out by a receiving-side PLL circuit and a transmitting-side PLL circuit, respectively, after which their phases are compared in a phase comparator to generate a justification request. In another aspect of the present invention, the phase comparison is made between VC-4 clocks whose clock inhibit timings are dispersed. In a further aspect of the present invention, a justification request arising from a frequency difference between the transmitting and receiving sides is combined with the justification contained in the received frame.

14 Claims, 12 Drawing Sheets

PAYLOAD RELATIVE POSITION CHANGE REQUESTING APPARATUS AND TRANSMISSION APPARATUS CONTAINING THE SAME

BACKGROUND OF THE INVENTION

1. Field of the Invention

In a transmission system, such as SDH (Synchronous Digital Hierarchy) or SONET (Synchronous Optical Network), in which each data frame consists of an overhead area and a payload area and is capable of accommodating a payload starting at any point within the payload area by including a pointer in a designated location in the overhead area to indicate the starting point of the payload accommodated in the payload area, the present invention relates to an apparatus for requesting a pointer action in a data frame at the transmitting side of a transmission apparatus in case the clock at the transmitting side goes out of synchronization with the clock at the receiving side, and also relates to the transmission apparatus containing such an apparatus.

In this specification, a description will be given by taking a system in which VC-4 is inserted as a payload in STM-n defined in ITU-T recommendations G.707, G.708, G.709, as an example of the transmission system that allows a payload to be inserted starting at any point within the payload area by using a pointer, but it will be appreciated that the present invention is not limited to this particular example, but can be applied to every kind of transmission system such as first described.

2. Description of the Related Art

To accommodate a VC-4 in an STM-n, first a pointer is appended to form a signal called AU-4. Appending a section overhead (SOH) to the AU-4 signal results in the formation of an STM-1 signal; the STM-n signal is a signal formed by byte-interleaving n STM-1 signals. When creating the AU-4 from the VC-4, the frame of the VC-4 signal can start at any point with respect to the beginning of the frame of the AU-4 signal and the position of the VC-4 can be changed at intermediate points along the transmission path. The pointer indicates where the VC-4 signal begins with respect to the starting point of the AU-4 signal.

A transmission apparatus for receiving and transmitting an STM-n signal needs to perform a pointer adjustment operation to adjust frequency and phase differences by increasing or decreasing the pointer value and thus changing the relative position of the VC-4 within the STM-n frame so that the VC-4 can be transmitted correctly without dropping or duplication, when the received STM-n frame is not synchronous with the transmitted STM-n frame, or if the frames go out of synchronization for some reason when they are normally synchronous.

In the pointer adjustment operation, when the phase of the received frame is advanced by more than a predetermined amount with respect to the phase of the transmitted frame, a negative justification is performed in which three bytes in the VC-4 are inserted in a designated location in the overhead area and the pointer in the next frame is decremented by one. To indicate the negative justification, the D bits (bits 8, 10, 12, 14, and 16 in the pointer word) of the immediately preceding pointer are inverted. Conversely, when the phase of the received frame is delayed by more than a predetermined amount with respect to the phase of the transmitted frame, a positive justification is performed in which three positive justification bytes are inserted in a designated location in the payload area and the pointer in the next frame is incremented by one. To indicate the positive justification, the I bits (bits 7, 9, 11, 13, and 15 in the pointer word) of the immediately preceding pointer are inverted. If there is a constant frequency difference between the received and transmitted frames, a pointer action of positive or negative justification should take place periodically.

In the prior art, this pointer adjustment operation has been performed in the following manner. The pointer contained in the received frame is examined in order to locate the range of the VC-4 in the received frame, and a clock is generated by selectively inhibiting portions of the AU-4 clock (or STM-1 clock) other than the portions thereof corresponding to the VC-4. At the transmitting end also, a similar clock is generated by selectively inhibiting portions of the clock other than the portions thereof corresponding to the VC-4. These clocks are also used to write and read the VC-4 data in and out of a buffer memory. After frequency dividing these partially inhibited clock signals by respective frequency dividers having a prescribed dividing factor (for example, 17), their phases are compared, and when the phase difference exceeds a predetermined threshold, a pointer action request for positive justification or negative justification in the transmitted frame is issued.

In the STM-1, the overhead area to be inhibited appears in a clustered manner with the 9-byte overhead appearing alternately with the 261-byte payload, which is also the case with other frame formats of this kind, so that clock inhibiting is performed in a clustered fashion. Accordingly, during the period when one of the clocks is being inhibited in a clustered fashion, the phase comparison cannot be made correctly and justification requests occur at unevenly spaced intervals, as will be described in detail later. This leads to the problem that when the original signal carried in the VC-4 is finally reproduced, low-frequency jitter, which is difficult to eliminate, will appear.

SUMMARY OF THE INVENTION

It is accordingly an object of the present invention to provide a pointer action requesting apparatus capable of issuing pointer action requests at evenly spaced intervals of time, and a transmission apparatus containing such an apparatus.

According to the present invention, there is provided an apparatus for effecting a request to change a payload relative position in an outgoing transmission frame in order to enable a payload contained in an incoming data frame to be mapped properly into an outgoing data frame in a transmission performed using a data frame containing an overhead area and a payload area and capable of accommodating a payload in any part of the payload area, comprising: an incoming-side PLL circuit for accepting at an input thereof a clock synchronized to data within the incoming data frame and containing selectively inhibited portions that are equal in number to portions of the data frame other than the portion of the payload contained therein, and for rearranging the timings of the clock at substantially equally spaced intervals; an outgoing-side PLL circuit for accepting at an input thereof a clock synchronized to data within the outgoing data frame and containing selectively inhibited portions that are equal in number to portions of the data frame other than the portion of the payload contained therein, and for rearranging the timings of the clock at substantially equally spaced intervals; and a phase comparator circuit for performing a phase comparison between an output of the incoming-side PLL circuit and an output of the outgoing-side PLL circuit, and for outputting the result of the phase comparison as a relative position change request in the outgoing data frame.

According to the present invention, there is also provided an apparatus for effecting a request to change a payload relative position in an outgoing transmission frame in order to enable a payload contained in an incoming data frame to be mapped properly into an outgoing data frame in a transmission performed using a data frame containing an overhead area and a payload area and capable of accommodating a payload in any part of the payload area, comprising: an incoming-side inhibit signal generating circuit for outputting temporally dispersed inhibit signals equal in number to portions of the incoming data frame other than the portion of the payload contained therein; an incoming-side inhibit circuit for selectively inhibiting a clock synchronized to data within the incoming data frame, in accordance with the incoming-side inhibit signals, and for outputting the selectively inhibited clock; an outgoing-side inhibit signal generating circuit for outputting temporally dispersed inhibit signals equal in number to portions of the outgoing data frame other than the portion of the payload contained therein; an outgoing-side inhibit circuit for selectively inhibiting a clock synchronized to data within the outgoing data frame, in accordance with the outgoing-side inhibit signals, and for outputting the selectively inhibited clock; and a phase comparator circuit for performing a phase comparison between the output of the incoming-side inhibit circuit and the output of the outgoing-side inhibit circuit, and for outputting the result of the phase comparison as a relative position change request in the outgoing data frame.

According to the present invention, there is also provided an apparatus for effecting a request to change a payload relative position in an outgoing transmission frame in order to enable a payload contained in an incoming data frame to be mapped properly into an outgoing data frame in a transmission performed using a data frame containing an overhead area and a payload area and capable of accommodating a payload in any part of the payload area, comprising: a phase comparator for performing a phase comparison between a clock synchronized to the incoming data frame and a clock synchronized to the outgoing data frame, and for outputting the result of the phase comparison as a relative position change request occurring due to a frequency difference; a first counter for calculating the period of the relative position change request occurring due to the frequency difference; a second counter for calculating the period of relative position changes contained in the incoming data frame; means for determining a relative position change request period in the outgoing data frame from the values of the periods output from the first and second counters; and a frequency divider for outputting the relative position change request in the outgoing data frame with the determined period.

According to the present invention, there is also provided a transmission apparatus for performing transmission using a data frame containing an overhead area and a payload area and capable of accommodating a payload in any part of the payload area by including in a designated location in the overhead area a pointer indicating the beginning of the payload accommodated in the payload area, comprising: a received-pointer interpretation block for interpreting a received pointer contained in a received data frame, and for outputting a received-payload timing signal indicating the beginning of a payload and also outputting a clock that is synchronized to data within the received data frame and whose portions other than the portions thereof corresponding to the payload are inhibited in a clustered fashion; a memory for sequentially storing the received-payload timing signal and the payload contained in the received data frame in response to the clusteringly inhibited clock output from the received-pointer interpretation block; a transmit pointer determining block for determining, from a transmit data frame timing signal indicating the beginning of a transmit data frame, the received-payload timing signal read out of the memory, and a pointer action request requesting a pointer adjustment in the transmit data frame, a transmit pointer for the transmit data frame and a clock synchronized to data within the transmit data frame for sequentially reading the payload from the memory, the clock being such that portions thereof other than the portions corresponding to the payload are inhibited in a clustered fashion, and for outputting the transmit pointer and the clock thus determined; a transmit pointer appending block for appending the transmit pointer to the payload read out of the memory in accordance with the clusteringly inhibited clock output from the transmit pointer determining block; a receiving-side PLL circuit for accepting at an input thereof a clock synchronized to the data within the receive data frame and containing selectively inhibited portions that are equal in number to portions of the data frame other than the portion of the payload contained therein, and for rearranging the timings of the clock at substantially equally spaced intervals; a transmitting-side PLL circuit for accepting at an input thereof a clock synchronized to the data within the transmit data frame and containing selectively inhibited portions that are equal in number to portions of the data frame other than the portion of the payload contained therein, and for rearranging the timings of the clock at substantially equally spaced intervals; and a phase comparator circuit for performing a phase comparison between an output of the receiving-side PLL circuit and an output of the transmitting-side PLL circuit, and for outputting the result of the phase comparison as the pointer action request in the transmit data frame.

According to the present invention, there is also provided a transmission apparatus for performing transmission using a data frame containing an overhead area and a payload area and capable of accommodating a payload in any part of the payload area by including in a designated location in the overhead area a pointer indicating the beginning of the payload accommodated in the payload area, comprising: a received-pointer interpretation block for interpreting a received pointer contained in a received data frame, and for outputting a received-payload timing signal indicating the beginning of a payload and also outputting a clock that is synchronized to data within the received data frame and whose portions other than the portions thereof corresponding to the payload are inhibited in a clustered fashion; a memory for sequentially storing the received-payload timing signal and the payload contained in the received data frame in response to the clusteringly inhibited clock output from the received-pointer interpretation block; a transmit pointer determining block for determining, from a transmit data frame timing signal indicating the beginning of a transmit data frame, the received-payload timing signal read out of the memory, and a pointer action request requesting a pointer adjustment in the transmit data frame, a transmit pointer for the transmit data frame and a clock synchronized to data within the transmit data frame for sequentially reading the payload from the memory, the clock being such that portions thereof other than the portions corresponding to the payload are inhibited in a clustered fashion, and for outputting the transmit pointer and the clock thus determined; a transmit pointer appending block for appending the transmit pointer to the payload read out of the memory in accordance with the clusteringly inhibited clock output from the transmit pointer determining block; a receiving-side inhibit signal generating circuit for outputting temporally dispersed inhibit signals equal in number to the portions of the received data frame other than the portion of the payload contained therein; a receiving-side inhibit circuit for selectively inhibiting the clock synchronized to the data within the received data frame, in accordance with the receiving-side inhibit signals, and for outputting the selectively inhibited clock; transmitting-side inhibit signal generating circuit for outputting temporally dispersed inhibit signals equal in number to the portions of the transmit data frame other than the portion of the payload contained therein; and a transmitting-side inhibit circuit for selectively inhibiting the clock synchronized to the data within the transmit data frame, in accordance with the transmitting-side inhibit signals, and for outputting the selectively inhibited clock; and a phase comparator circuit for performing a phase comparison between the output of the receiving-side inhibit circuit and the output of the transmitting-side inhibit circuit, and for outputting the result of the phase comparison as the pointer action request in the transmit data frame.

According to the present invention, there is also provided a transmission apparatus for performing transmission using a data frame containing an overhead area and a payload area and capable of accommodating a payload in any part of the payload area by including in a designated location in the overhead area a pointer indicating the beginning of the payload accommodated in the payload area, comprising: a received-pointer interpretation block for interpreting a received pointer contained in a received data frame, and for outputting a received-payload timing signal indicating the beginning of a payload and also outputting a clock that is synchronized to data within the received data frame and whose portions other than the portions thereof corresponding to the payload are inhibited in a clustered fashion; a memory for sequentially storing the received-payload timing signal and the payload contained in the received data frame in response to the clusteringly inhibited clock output from the received-pointer interpretation block; a transmit pointer determining block for determining, from a transmit data frame timing signal indicating the beginning of a transmit data frame, the received-payload timing signal read out of the memory, and a pointer action request requesting a pointer adjustment in the transmit data frame, a transmit pointer for the transmit data frame and a clock synchronized to data within the transmit data frame for sequentially reading the payload from the memory, the clock being such that portions thereof other than the portions corresponding to the payload are inhibited in a clustered fashion, and for outputting the transmit pointer and the clock thus determined; a transmit pointer appending block for appending the transmit pointer to the payload read out of the memory in accordance with the clusteringly inhibited clock output from the transmit pointer determining block; a phase comparator for performing a phase comparison between a clock synchronized to the received data frame and a clock synchronized to the transmit data frame, and for outputting the result of the phase comparison as a pointer action request occurring due to a frequency difference; a first counter for calculating the period of the pointer action request occurring due to the frequency difference; a second counter for calculating the period of pointer actions contained in the received data frame; means for determining a pointer action period in the transmit data frame from the values of the periods output from the first and second counters; and a frequency divider for outputting the pointer action request in the transmit data frame with the determined period.

DESCRIPTION OF THE PREFERRED EMBODIMENTS

Figure 1:
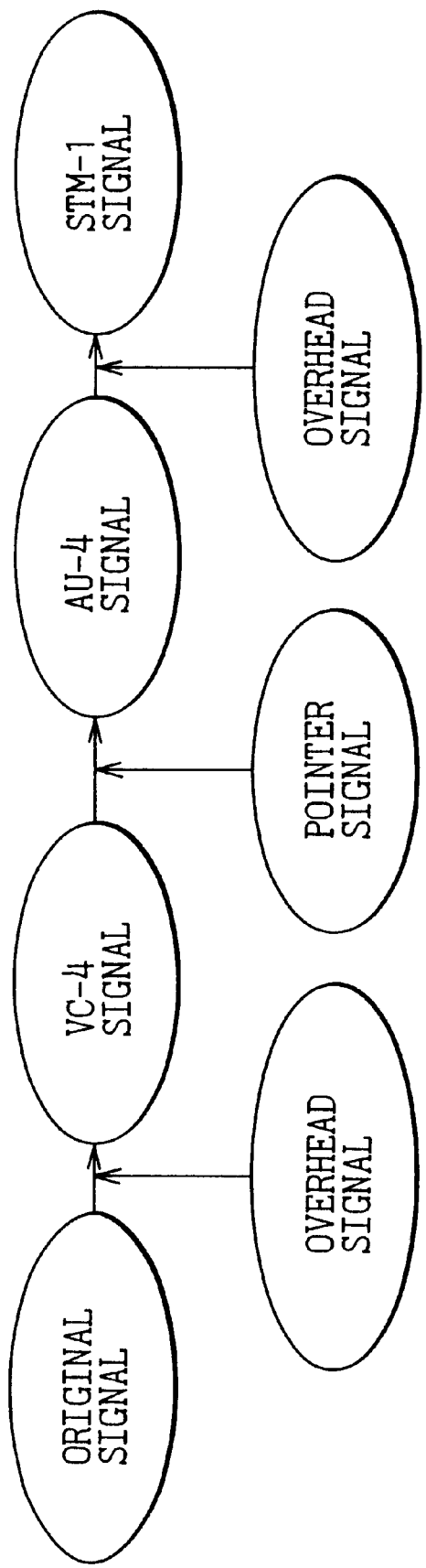
FIG. 1 is a diagram conceptually showing the process in which the original signal is mapped into an STM-1 signal.

FIG. 1 is a conceptual diagram showing the process in which the original signal is mapped into an STM-1 signal. In FIG. 1, an overhead signal (pass overhead: POH) is appended to the original signal (for example, a C-4 signal of 139.264 Mbits/s) to generate the standard VC-4 signal of 150.336 Mbits/s, and a pointer signal is appended to the VC-4 signal, thus forming an AU-4 signal. As previously described, at this time the frame phase of the VC-4 need not be aligned with the frame phase of the AU-4 signal. The AU-4 signal is then mapped into the STM-1 signal of 155.52 Mbits/s by appending an overhead (section overhead: SOH).

Figure 2:
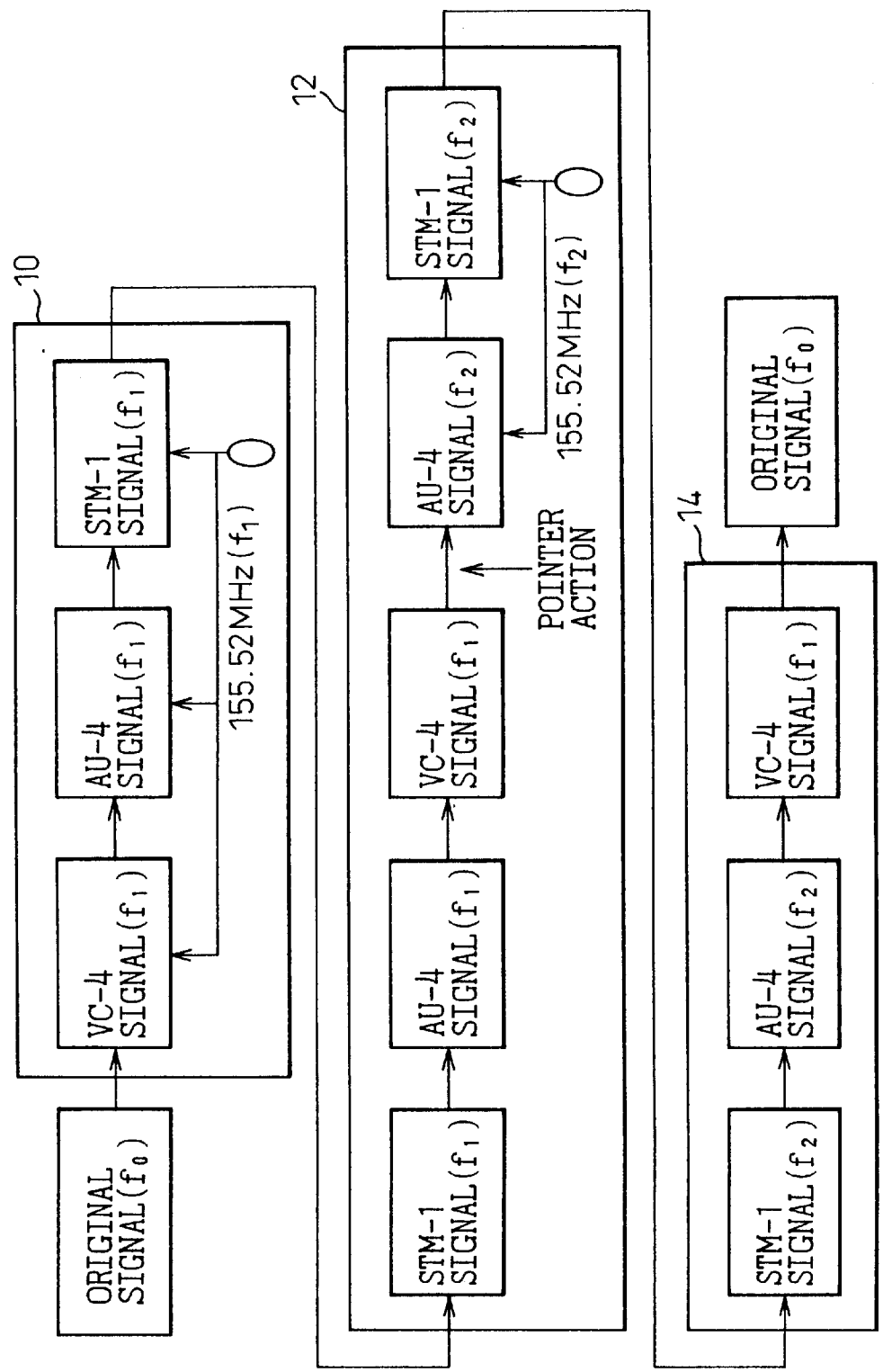
FIG. 2 is a diagram conceptually showing how the original signal is transported by the STM-1 signal.

FIG. 2 is a conceptual diagram showing how the original signal is transported by the STM-1 signal. The original signal synchronized to a clock of frequency $f_0$ (for example, 139.264 MHz) is assembled in an SDH transmission apparatus 10 into the STM-1 signal by way of the VC-4 signal and AU-4 signal. At this time, the VC-4 signal whose standard rate is 150.336 Mbits/s is not operating at 150.336 MHz, but is operating with a VC-4 clock which is an STM-1 clock of 155.52 MHz ($f_1$) whose SOH and pointer areas are inhibited, as shown in FIG. 2. The AU-4 signal is operating with an AU-4 clock which is the STM-1 clock whose SOH area is inhibited.

In an SDH transmission apparatus 12, the VC-4 signal is extracted through the AU-4 signal from the STM-1 signal received from the SDH transmission apparatus 10. If the signal is to be further forwarded to another transmission apparatus, an STM-1 signal is generated by way of an AU-4 signal. The AU-4 signal and the STM-1 signal at this time operate with the clock $f_2$ of the transmission apparatus 12. When the clock $f_2$ of the SDH transmission apparatus 12 is nonsynchronous with the clock $f_1$ of the SDH transmission apparatus 10, or if they are normally synchronous, then to prepare for a situation where they go out of synchronization for some reason, a pointer action function is provided that performs positive justification or negative justification as needed when converting the VC-4 into the AU-4.

In an SDH transmission apparatus 14, the original signal of frequency $f_0$ is recovered through the AU-4 signal and VC-4 signal from the STM-1 signal received from the transmission apparatus 12. When extracting the VC-4 from the AU-4, the pointer signal contained in the AU-4 signal is analyzed in order to recover the VC-4. If, at this time, pointer actions performed in the SDH apparatus 12 are not evenly spaced in time, low-frequency jitter will be introduced in the recovered VC-4. Therefore, pointer actions must be performed at evenly spaced intervals of time.

Figure 3:
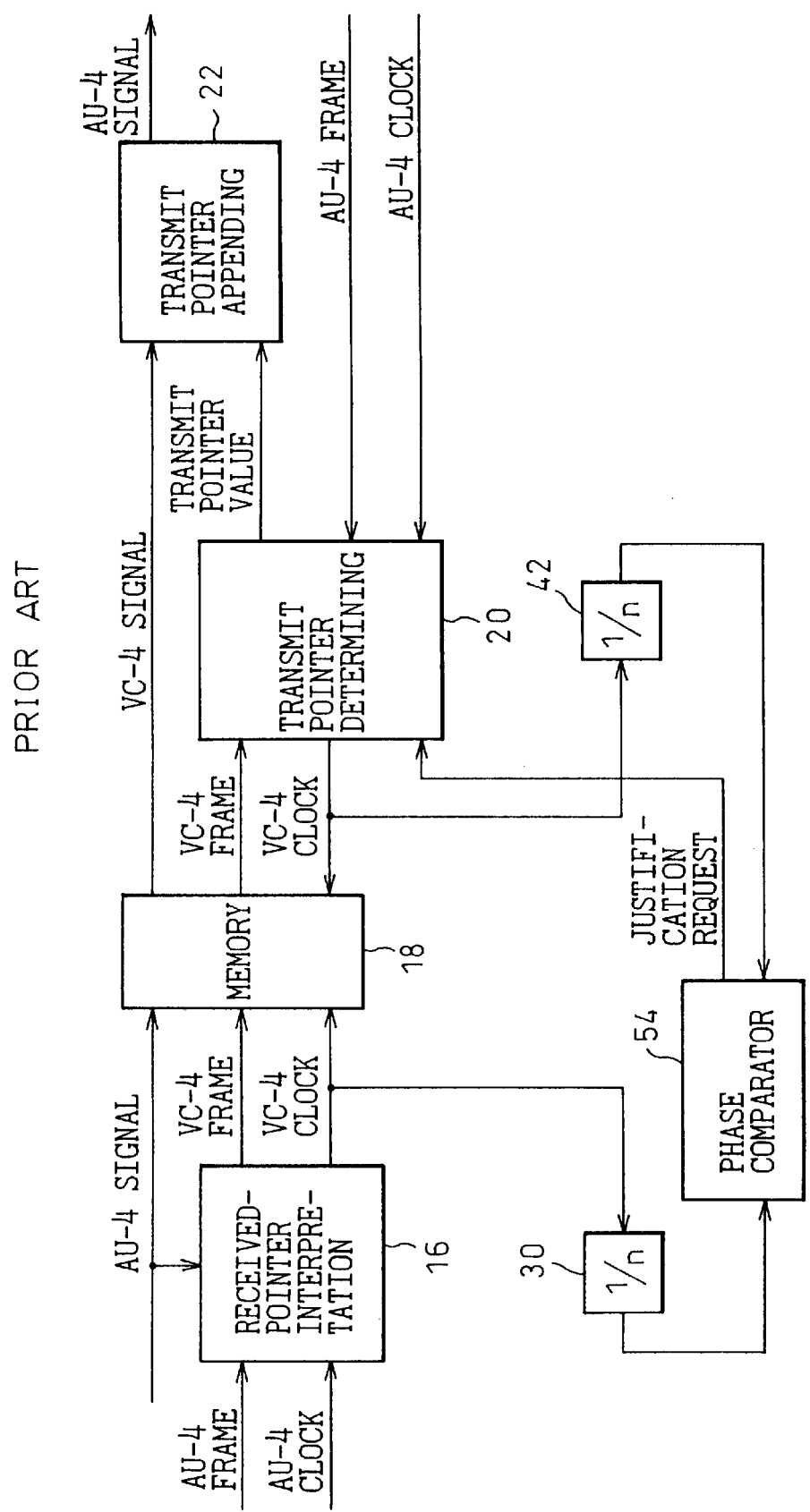
FIG. 3 is a diagram showing the prior art.

FIG. 3 is a block diagram of an SDH transmission apparatus according to the prior art. FIG. 3 and other figures given hereinafter show only a portion where the VC-4 signal is extracted from the AU-4 signal with the SOH removed from the received STM-1 signal and the AU-4 signal is reassembled by appending a new pointer.

In FIG. 3, a received-pointer interpretation block 16 reads the pointer signal from the AU-4 signal based on an AU-4 frame signal indicating the timing of the starting point of the AU-4 frame and on the AU-4 clock (the STM-1 clock whose portions corresponding to SOH are inhibited) recovered from the received signal and, based on the value of the pointer, generates and outputs a VC-4 frame signal indicating the starting point of the VC-4 signal and a VC-4 clock which is equivalent to the AU-4 clock whose portions corresponding to the overhead are inhibited. If it is detected through majority logic that positive justification bytes are contained (the I bits of the pointer are inverted), portions corresponding to the positive justification bytes are also inhibited, and if it is detected that negative justification bytes are contained (the D bits of the pointer are inverted), portions corresponding to the negative justification bytes are not inhibited.

By storing the AU-4 signal in a memory 18 based on the VC-4 clock output from the received-pointer interpretation block 16, only the VC-4 signal is stored in the memory 18. The VC-4 frame signal is also stored in the memory 18 along with the VC-4 signal.

A transmit pointer determining block 20 generates a transmit VC-4 frame clock from the transmit AU-4 frame signal and AU-4 clock. When performing positive justification based on a justification request (described later), portions of the clock corresponding to the positive justification bytes are also inhibited, and when performing negative justification, portions of the clock corresponding to the negative justification bytes are not inhibited. The VC-4 signal and VC-4 frame signal are read from the memory 18 in accordance with the VC-4 clock output from the transmit pointer determining block 20, and the transmit pointer determining block 20 determines the value of the transmit pointer based on the thus read VC-4 frame signal, the AU-4 frame signal, and the presence or absence of pointer action.

A transmit pointer appending block 22 generates the AU-4 signal by appending the transmit pointer value output from the transmit pointer determining block 20 to the VC-4 signal read out of the memory 18.

A phase comparator 54 performs a phase comparison between the received VC-4 clock divided by n by a frequency divider 30 and the transmitted VC-4 clock divided by n by a frequency divider 42, and issues a justification request (pointer action request) of the positive or negative justification if the phase difference is greater than a predetermined threshold.

Figure 4:
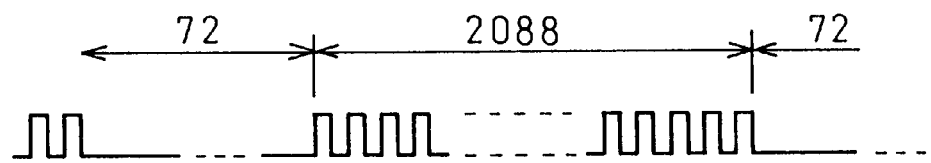
FIG. 4 is a waveform diagram of a VC-4 clock inhibited in a clustered fashion.

As previously described, in the STM-1 (more generally, the STM-n) the 72-bit (9-byte) overhead and the 2088-bit (261-byte) payload appear alternately (when no pointer action is done); as a result, in both the received and transmitted clocks, 72 clocks are inhibited in a clustered fashion in a cycle of 2160 clocks, as shown in FIG. 4.

Figure 5:
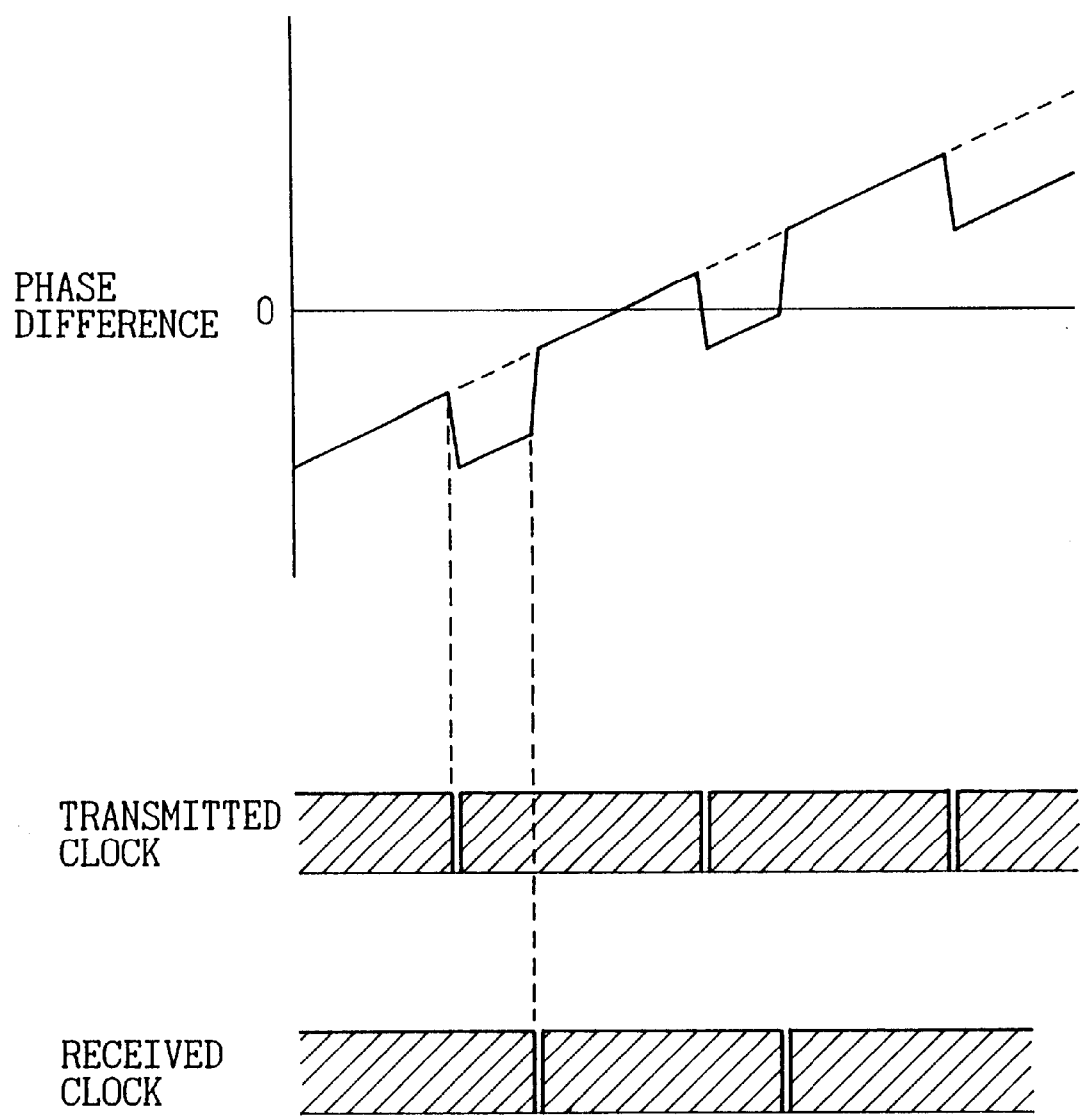
FIG. 5 is a diagram for explaining phase comparisons in the prior art.

Therefore, the results of the phase comparisons in the phase comparator 54 are as shown in FIG. 5. In FIG. 5, the phase difference generally exhibits a tendency to rise upward to the right because of frequency differences between the transmitted and received clocks. During the period when the transmitted clock is inhibited in a clustered fashion, the phase difference decreases rapidly and, during the period when the received clock is inhibited in a clustered fashion, the phase difference increases rapidly back to the original graph line. The actual phase relationship at this time is indicated in the figure by the upper line extending from the clustering inhibiting of the received clock to the clustering inhibiting of the transmitted clock, and the apparent phase difference is reduced in the period from the clustering inhibiting of the transmitted clock to the clustering inhibiting of the received clock.

Figure 6:
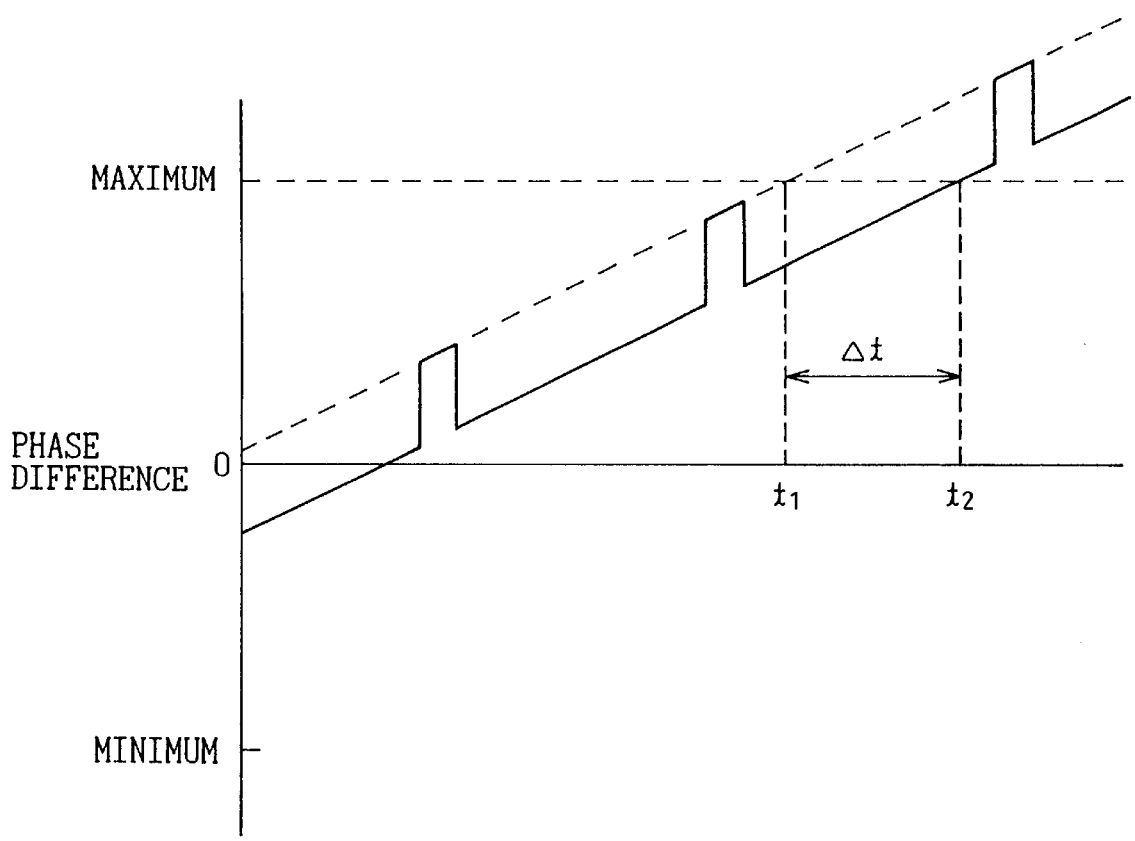
FIG. 6 is a diagram for explaining pointer action in the prior art.

The length of the period from the clustering inhibiting of the received clock to the clustering inhibiting of the transmitted clock varies periodically because of frequency differences. As shown in FIG. 6, suppose here that the period from the position of the inhibited cluster of the transmitted clock to the position of the inhibited cluster of the received clock is increased, relatively widening the region where the phase difference appears as if it is decreased. In that case, an actual pointer action occurs at time $t_2$ delayed by $\Delta t$ from $t_1$ at which the pointer action should otherwise occur. Further, since the actual phase difference has increased correspondingly with the delay of the pointer action, the next pointer action occurs earlier.

Thus, in the prior art, since the phase comparison is performed using the clocks inhibited in a clustered fashion, pointer actions occur at unevenly spaced intervals.

Figure 7:
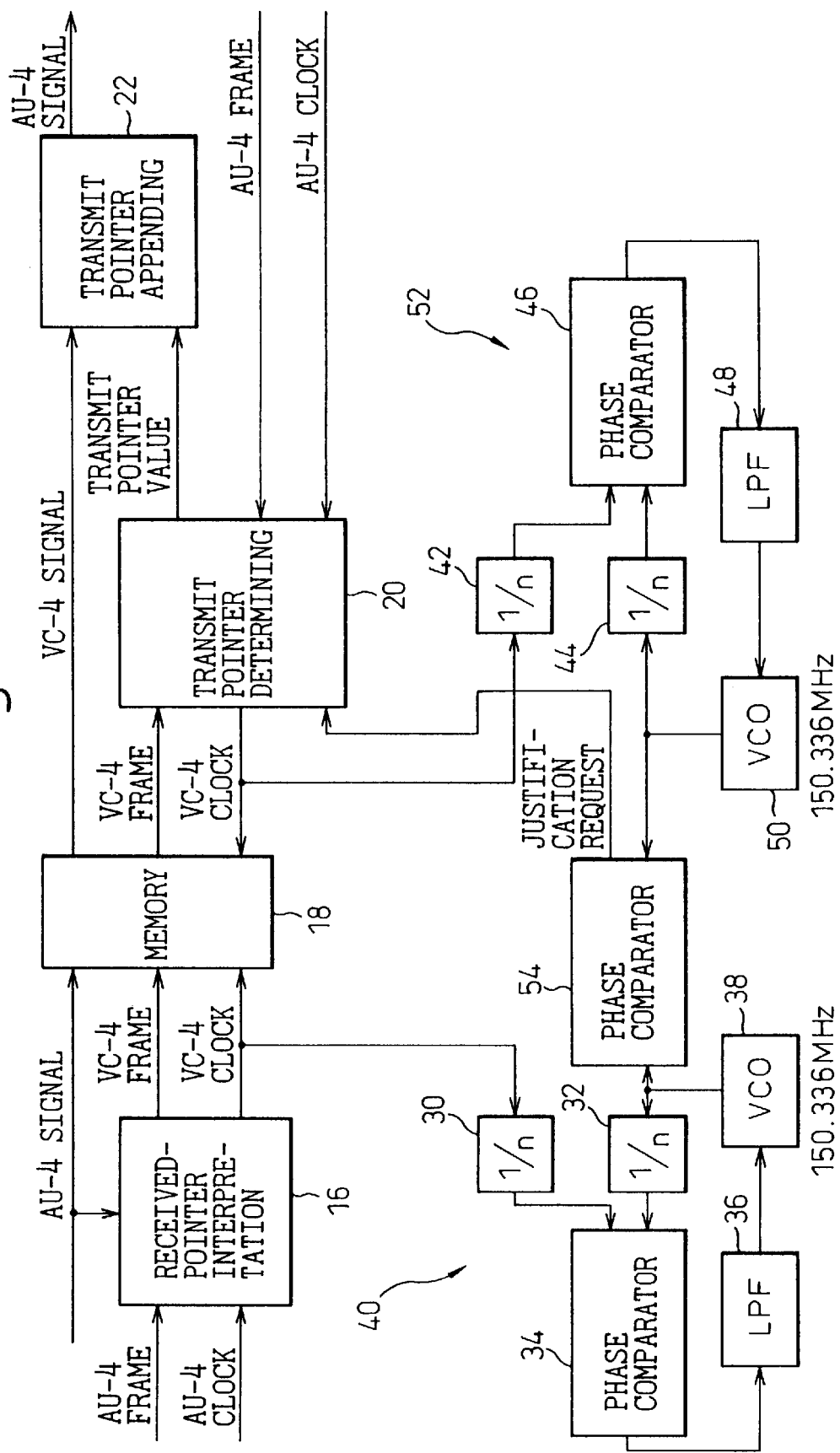
FIG. 7 is a diagram showing a first embodiment of the present invention.

FIG. 7 is a block diagram showing an SDH transmission apparatus according to a first embodiment of the present invention. In FIG. 7, a received-pointer interpretation block 16 reads the pointer signal from the AU-4 signal based on an AU-4 frame signal indicating the timing of the starting point of the AU-4 frame and on the AU-4 clock (the STM-1 clock whose portions corresponding to SOH are inhibited) and, based on the value of the pointer, generates and outputs a VC-4 frame signal indicating the starting point of the VC-4 signal and a VC-4 clock which is equivalent to the AU-4 clock whose portions corresponding to the overhead are inhibited. If it is detected through majority logic that positive justification bytes are contained (the I bits of the pointer are inverted), portions corresponding to the positive justification bytes are also inhibited, and if it is detected that negative justification bytes are contained (the D bits of the pointer are inverted), portions corresponding to the negative justification bytes are not inhibited.

By storing the AU-4 signal in a memory 18 based on the VC-4 clock output from the received-pointer interpretation block 16, only the VC-4 signal is stored in the memory 18. The VC-4 frame signal is also stored in the memory 18 along with the VC-4 signal.

A transmit pointer determining block 20 generates a transmit VC-4 frame clock from the AU-4 frame signal and AU-4 clock at the transmitter. When performing positive justification based on a justification request (described later), portions of the clock corresponding to the positive justification bytes are also inhibited, and when performing negative justification, portions of the clock corresponding to the negative justification bytes are not inhibited. The VC-4 signal and VC-4 frame signal are read from the memory 18 in accordance with the VC-4 clock output from the transmit pointer determining block 20, and the transmit pointer determining block 20 determines the value of the transmit pointer based on the thus read VC-4 frame signal, the AU-4 frame signal, and the presence or absence of pointer action.

A transmit pointer appending block 22 generates the AU-4 signal by appending the transmit pointer value output from the transmit pointer determining block 20 to the VC-4 signal read out of the memory 18.

Frequency dividers 30 and 32, a phase comparator 34, a loop filter 36, and a voltage-controlled oscillator 38 with a center frequency of 150.336 MHz, together constitute a receiving-side PLL (Phase-Locked Loop) circuit 40. The receiving-side PLL circuit 40 rearranges the timings of the receive VC-4 clock at equally spaced intervals along the time axis.

Frequency dividers 42 and 44, a phase comparator 46, a loop filter 48, and a voltage-controlled oscillator 50 with a center frequency of 150.336 MHz, together constitute a transmitting-side PLL (Phase-Locked Loop) circuit 52. The transmitting-side PLL circuit 52 rearranges the timings of the transmit VC-4 clock at equally spaced intervals along the time axis.

A phase comparator 54 performs a phase comparison between the output of the receiving-side PLL circuit 40 and the output of the transmitting-side PLL circuit 52 and, if the phase difference is greater than a threshold, outputs a justification request (pointer action request) of the positive justification or negative justification.

According to the first embodiment of the present invention, since the receive and transmit VC-4 clocks whose portions corresponding to the overhead are inhibited in a clustered fashion are evened out by the respective PLL circuits, pointer action equally spaced along the time axis can be achieved.

Figure 8:
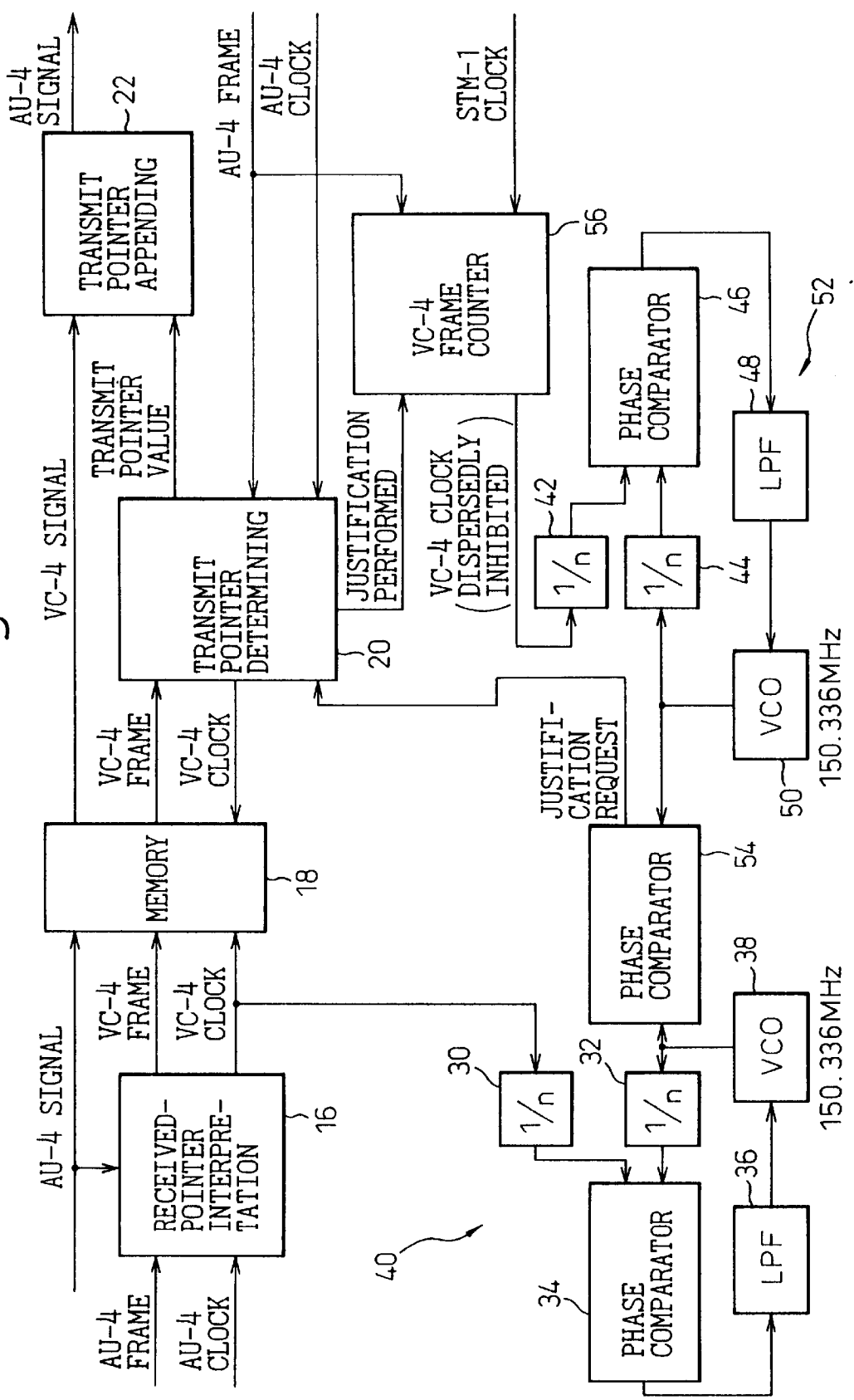
FIG. 8 is a diagram showing a second embodiment of the present invention.

FIG. 8 is a block diagram showing an SDH transmission apparatus according to a second embodiment of the present invention. The difference from the embodiment shown in FIG. 7 is that the VC-4 clock supplied to the transmitting-side PLL circuit 52 is a VC-4 clock which is output from a VC-4 frame counter 56 and whose inhibit timings are dispersed along the time axis, not the clusteringly inhibited VC-4 clock output from the transmit pointer determining block 20.

Figure 9:
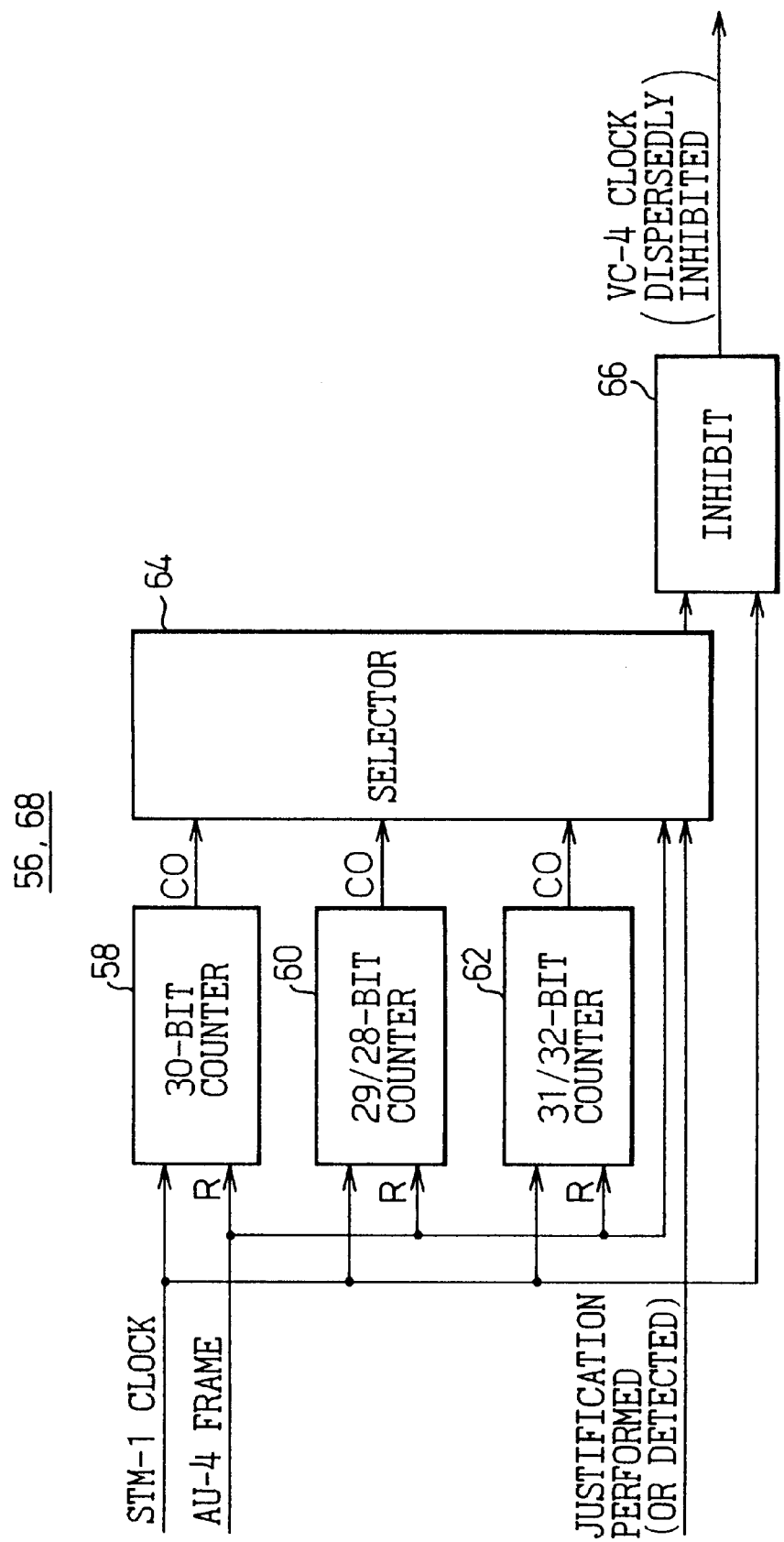
FIG. 9 is a diagram showing the detailed configuration of a VC-4 frame counter.

FIG. 9 shows the detailed configuration of the VC-4 frame counter 56. The VC-4 frame counter 56 comprises a 30-bit counter 58 which provides the inhibit timings dispersed along the time axis when no pointer action is performed, a 29/28-bit counter 60 which provides the inhibit timings dispersed along the time axis when positive justification is performed, and a 31/32-bit counter 62 which provides the inhibit timings dispersed along the time axis when negative justification is performed.

The 30-bit counter 58, after being reset by the AU-4 frame signal, outputs a carry for every 30 clocks. The STM-1 signal carries 9×270×8=19,440 bits per frame and, when no pointer action is performed, contains a VC-4 signal of 9×261×8=18,792 bits in one frame, leaving 19,440−18,792= 648 bits per frame for data other than the VC-4. When no pointer action is performed, the ratio of the data other than the VC-4 to the total frame capacity, that is, the ratio of the clock to be inhibited, is 648:19440=1:30, from which it can be seen that the 30-bit counter 58, which outputs a carry for every 30 clocks, outputs inhibit signals (carries) necessary when no pointer action is performed, at equally spaced intervals spread out in time.

The 29/28-bit counter 60, after being reset by the AU-4 frame signal, outputs a carry for every 29 clocks and repeats this pattern 13 times followed by an output of a carry once for 28 clocks; this cycle is repeatedly performed. Accordingly, the interval at which the carries as inhibit signals are output is substantially constant; the ratio of the inhibiting is (13+1):(29×13+28)=14:405. This ratio coincides with the ratio of the data other than VC-4 to the total frame capacity, (648+24):19440=14:405, when positive justification is performed. That is, the 29/28-bit counter 60 outputs the inhibit signals necessary when positive justification is performed, at substantially equally spaced intervals spread out in time.

The 31/32-bit counter 62, after being reset by the AU-4 frame signal, outputs a carry for every 31 clocks and repeats this pattern six times followed by an output of one carry for 32 clocks; after repeating this cycle 89 times, the 31/32-bit counter 62 outputs a carry once for the remaining 38 clocks in the frame. Accordingly, the interval at which the carries as inhibit signals are output is substantially constant; {(6+ 1)×89+1)}=624 carries are output during one frame period. This number coincides with the bit count 648−24=624 of the data other than VC-4 in one frame when negative justification is performed. That is, the 31/32-bit counter 62 outputs the inhibit signals necessary when positive justification is performed, at substantially equally spaced intervals spread out in time.

A selector 64 selects the output of one of the counters, the 30-bit counter 58, the 29/28-bit counter 60, or the 31/32-bit counter 62, in accordance with a signal indicating whether justification is performed or not. An inhibit circuit 66 selectively inhibits the STM-1 clock of 155.52 MHz in response to the inhibit signal selected by the selector 64, and outputs the VC-4 clock whose inhibit timings are dispersed at substantially equally spaced intervals.

Figure 10:
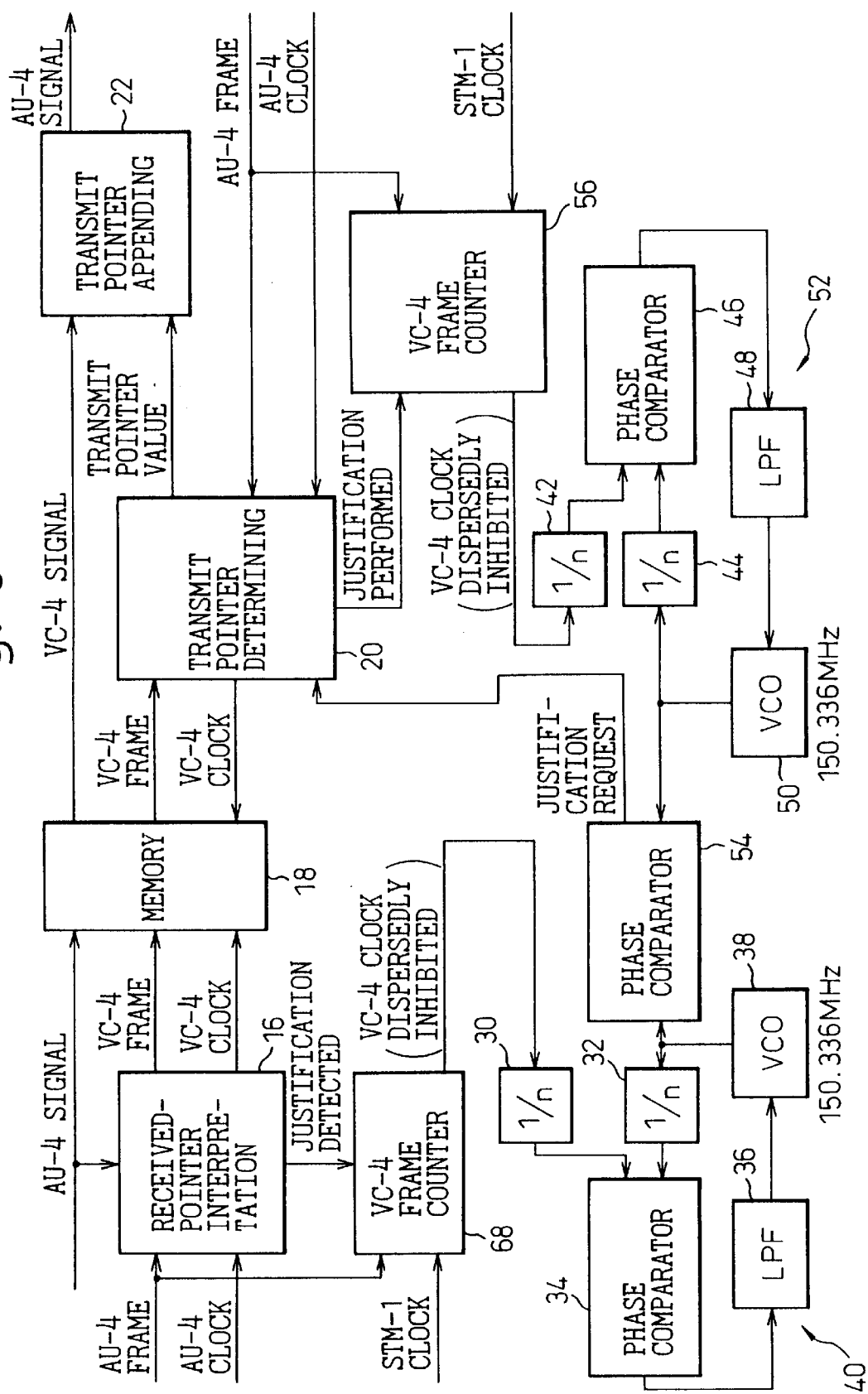
FIG. 10 is a diagram showing a third embodiment of the present invention.

FIG. 10 is a block diagram showing an SDH transmission apparatus according to a third embodiment of the present invention. The difference from the embodiment shown in FIG. 8 is that the VC-4 frame counter 68 is provided not only at the transmitter but also at the receiver, so that the VC-4 clock supplied to the receiving PLL circuit 40 is the VC-4 clock which is output from the VC-4 frame counter 68 and whose inhibit timings are dispersed along the time axis, not the clusteringly inhibited VC-4 clock output from the received-pointer interpretation block 16.

The VC-4 frame counter 68 has the same configuration as the VC-4 frame counter 56, such as the one shown in FIG. 9. The signal indicating the presence or absence of pointer action is supplied from the received-pointer interpretation block 16.

Figure 11:
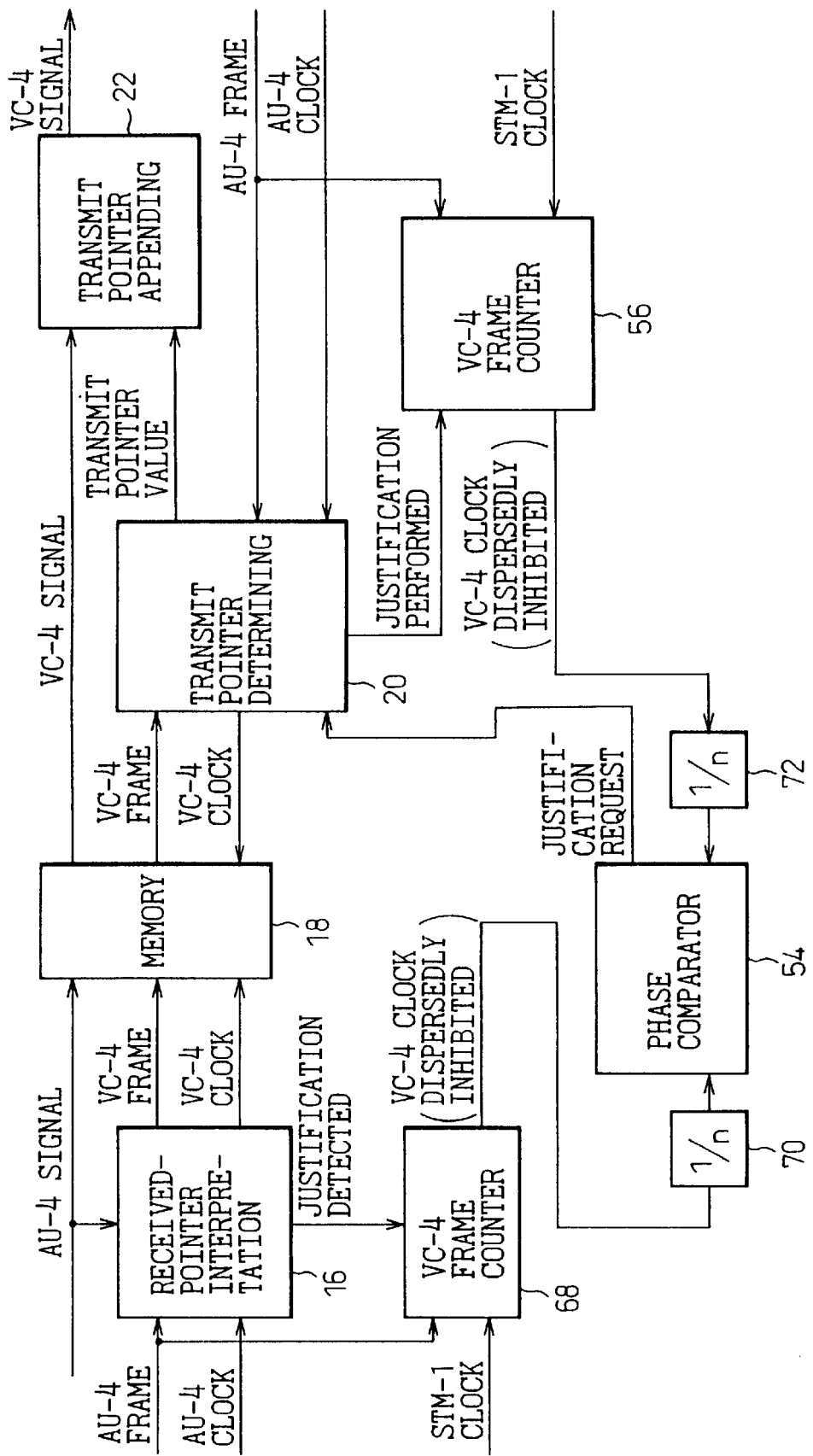
FIG. 11 is a diagram showing a fourth embodiment of the present invention.

FIG. 11 is a block diagram showing an SDH transmission apparatus according to a fourth embodiment of the present invention. The difference from the embodiment shown in FIG. 10 is that the dispersedly inhibited VC-4 clocks output from the respective VC-4 frame counters 68 and 56 are supplied to the phase comparator 54 for phase comparison after being frequency divided by the respective frequency dividers 70 and 72 without being evened out by the respective PLL circuits. Since the inhibit timings of each VC-4 clock are already evened out, evenly dispersed pointer action request timings can be obtained without having to even them out using PLL circuits.

Figure 12:
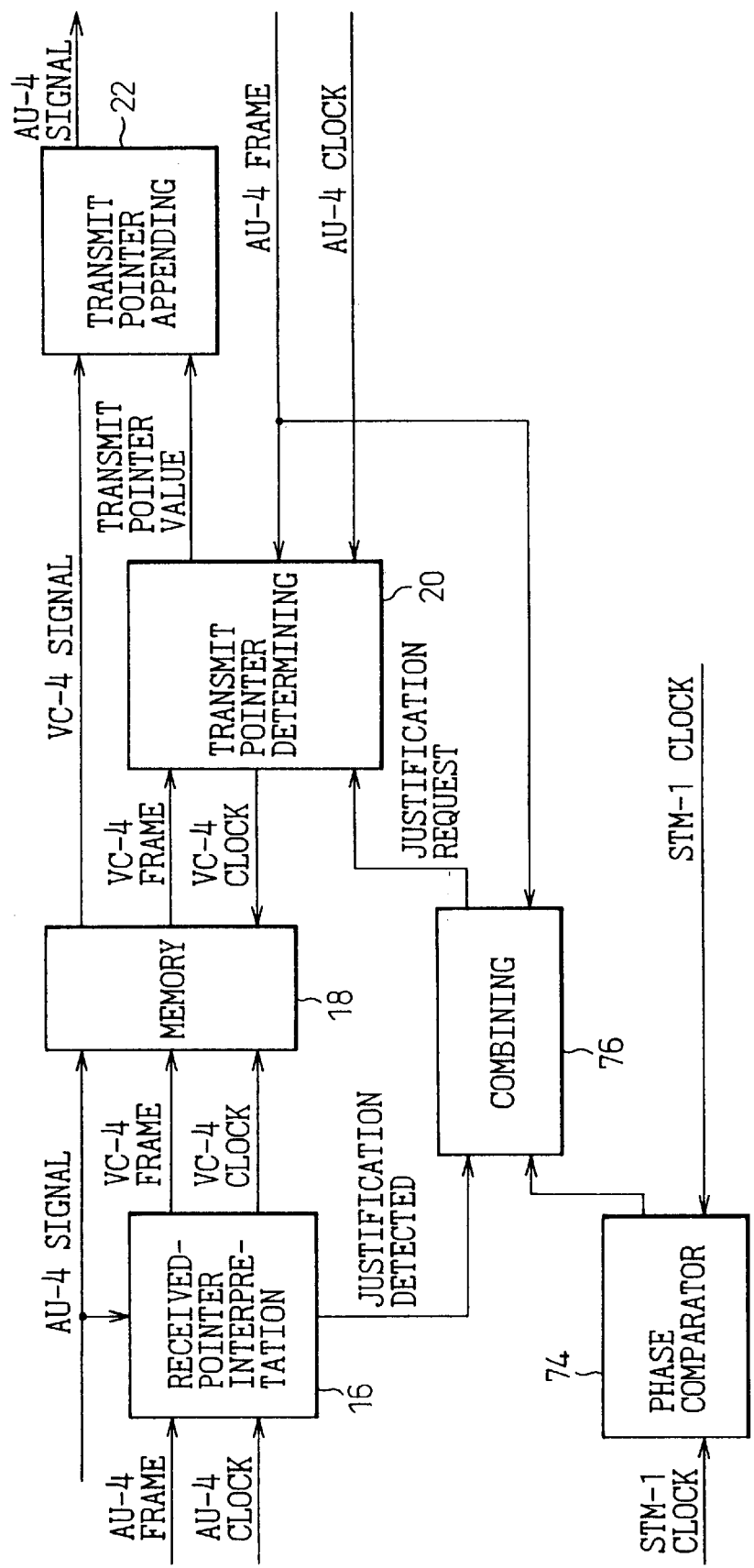
FIG. 12 is a diagram showing a fifth embodiment of the present invention.

FIG. 12 is a block diagram showing an SDH transmission apparatus according to a fifth embodiment of the present invention. In FIG. 12, a phase comparator 74 compares the phase difference between the 155.52-MHz STM-1 clock at the receiver and the 155.52-MHz STM-1 clock at the transmitter and, based on the result of the comparison, outputs a justification request caused by the frequency difference between the transmitter and receiver. A combining block 76 combines the frequency-difference-caused justification request output from the phase comparator 74 with the justification contained in the received frame, and supplies a justification request representing the combined result to the transmit pointer determining block 20.

Figure 13:
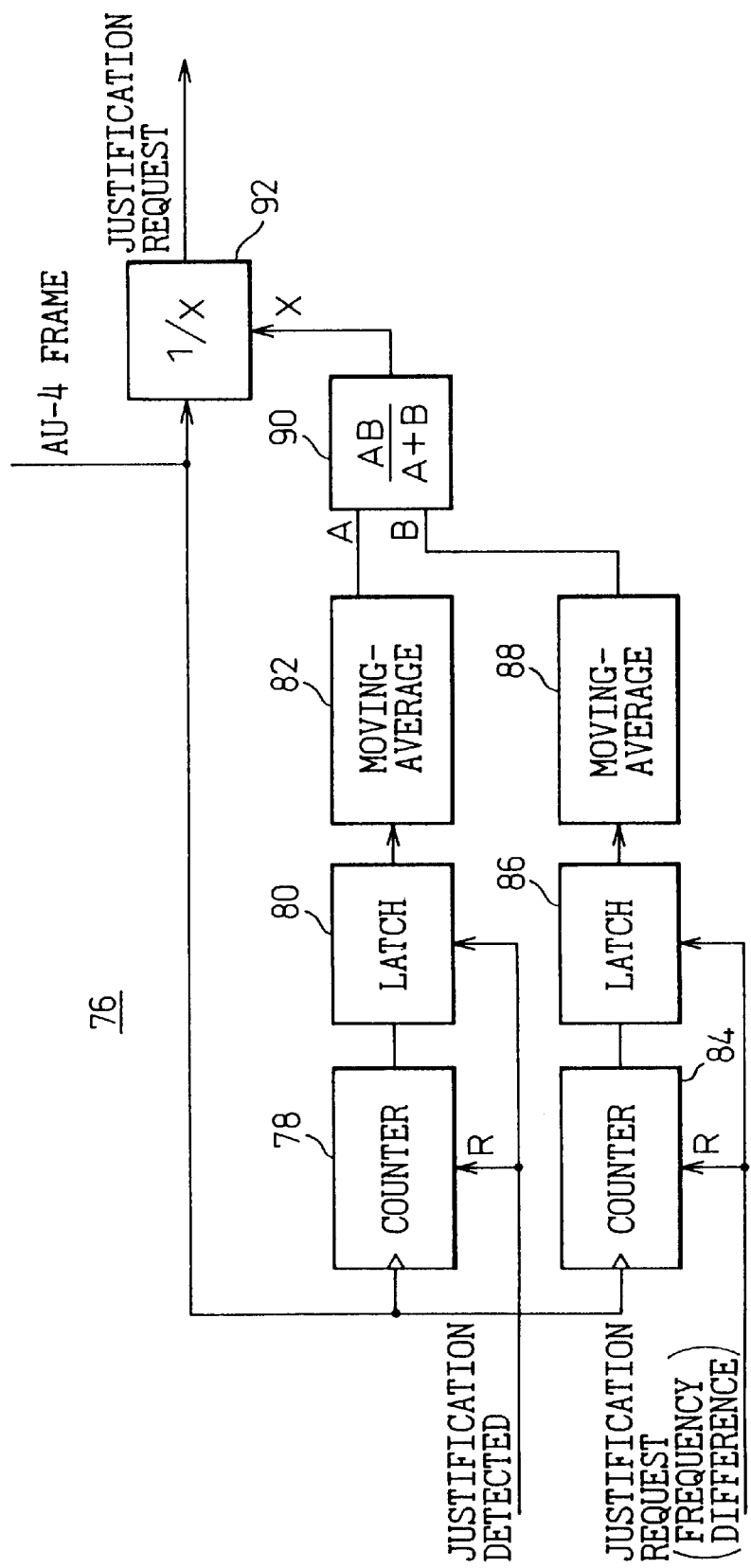
FIG. 13 is a diagram showing the detailed configuration of a combining block.

FIG. 13 shows the detailed configuration of the combining block 76. A counter 78 measures the interval between justifications contained in the received frame by counting the AU-4 frame signal during an interval from the time a justification is detected to the time the next justification is detected, and the result is latched into a latch 80 and input to a moving-average block 82 for the calculation of a moving average. For the frequency-difference-caused justification request also, the interval is measured by a counter 84, is latched into a latch 86, and the moving average is calculated by a moving-average block 88. An arithmetic block 90 performs the calculation $1/(1/A+1/B)=AB/(A+B)$ to calculate the interval between justification requests by combining the above two results. When the justification is negative, the value is treated as a negative value. A frequency divider 92 divides the AU-4 frame signal by the output value of the arithmetic block 90, and thus outputs a justification request with the frequency-difference-caused justification request combined with the justification contained in the received frame.

What is claimed is:

1. In a transmission performed using a data frame containing an overhead area and a payload area and capable of accommodating a payload in any part of said payload area, an apparatus for effecting a request to change a payload relative position in an outgoing transmission frame in order to enable a payload contained in an incoming data frame to be mapped properly into an outgoing data frame, comprising:

an incoming-side PLL circuit for accepting at an input thereof a clock synchronized to data within said incoming data frame and containing selectively inhibited portions that are equal in number to portions of said data frame other than the portion of said payload contained therein, and for rearranging timings of said clock at substantially equally spaced intervals;

an outgoing-side PLL circuit for accepting at an input thereof a clock synchronized to data within said outgoing data frame and containing selectively inhibited portions that are equal in number to portions of said data frame other than the portion of said payload contained therein, and for rearranging timings of said clock at substantially equally spaced intervals; and a phase comparator circuit for performing a phase comparison between an output of said incoming-side PLL circuit and an output of said outgoing-side PLL circuit, and for outputting the result of said phase comparison as a relative position change request in said outgoing data frame.

2. An apparatus according to claim 1, wherein said clock synchronized to said data within said incoming data frame and input to said incoming-side PLL circuit is a clock whose portions other than the portions thereof corresponding to said payload are inhibited in a clustered fashion, and said clock synchronized to said data within said outgoing data frame and input to said outgoing-side PLL circuit is a clock whose portions other than the portions thereof corresponding to said payload are inhibited in a clustered fashion.

3. An apparatus according to claim 1, further comprising:

an outgoing-side inhibit signal generating circuit for outputting temporally dispersed inhibit signals equal in number to said portions of said outgoing data frame other than the portion of said payload contained therein; and an outgoing-side inhibit circuit for selectively inhibiting said clock synchronized to said data within said outgoing data frame, in accordance with said outgoing-side inhibit signals, and for supplying said selectively inhibited clock to said outgoing-side PLL circuit.

4. An apparatus according to claim 1, further comprising:

an incoming-side inhibit signal generating circuit for outputting temporally dispersed inhibit signals equal in number to said portions of said incoming data frame other than the portion of said payload contained therein; and an incoming-side inhibit circuit for selectively inhibiting said clock synchronized to said data within said incoming data frame, in accordance with said incoming-side inhibit signals, and for supplying said selectively inhibited clock to said incoming-side PLL circuit.

5. In a transmission performed using a data frame containing an overhead area and a payload area and capable of accommodating a payload in any part of said payload area, an apparatus for effecting a request to change a payload relative position in an outgoing transmission frame in order to enable a payload contained in an incoming data frame to be mapped properly into an outgoing data frame, comprising:

an incoming-side inhibit signal generating circuit for outputting temporally dispersed inhibit signals equal in number to portions of said incoming data frame other than the portion of said payload contained therein;

an incoming-side inhibit circuit for selectively inhibiting a clock synchronized to data within said incoming data frame, in accordance with said incoming-side inhibit signals, and for outputting said selectively inhibited clock;

an outgoing-side inhibit signal generating circuit for outputting temporally dispersed inhibit signals equal in number to portions of said outgoing data frame other than the portion of said payload contained therein;

an outgoing-side inhibit circuit for selectively inhibiting a clock synchronized to data within said outgoing data frame, in accordance with said outgoing-side inhibit signals, and for outputting said selectively inhibited clock; and a phase comparator circuit for performing a phase comparison between the output of said incoming-side inhibit circuit and the output of said outgoing-side inhibit circuit, and for outputting the result of said phase comparison as a relative position change request in said outgoing data frame.

6. In a transmission performed using a data frame containing an overhead area and a payload area and capable of accommodating a payload in any part of said payload area, an apparatus for effecting a request to change a payload relative position in an outgoing transmission frame in order to enable a payload contained in an incoming data frame to be mapped properly into an outgoing data frame, comprising:

a phase comparator for performing a phase comparison between a clock synchronized to said incoming data frame and a clock synchronized to said outgoing data frame, and for outputting the result of said phase comparison as a relative position change request occurring due to a frequency difference;

a first counter for calculating the period of said relative position change request occurring due to said frequency difference;

a second counter for calculating the period of relative position changes contained in said incoming data frame;

means for determining a relative position change request period in said outgoing data frame from the values of said periods output from said first and second counters; and a frequency divider for outputting said relative position change request in said outgoing data frame with said determined period.

7. A transmission apparatus for performing transmission using a data frame containing an overhead area and a payload area and capable of accommodating a payload in any part of said payload area by including in a designated location in said overhead area a pointer indicating the beginning of said payload accommodated in said payload area, comprising:

a received-pointer interpretation block for interpreting a received pointer contained in a received data frame, and for outputting a received-payload timing signal indicating the beginning of a payload and also outputting a clock that is synchronized to data within said received data frame and whose portions other than the portions thereof corresponding to said payload are inhibited in a clustered fashion;

a memory for sequentially storing said received-payload timing signal and said payload contained in said received data frame in response to said clusteringly inhibited clock output from said received-pointer interpretation block;

a transmit pointer determining block for determining, from a transmit data frame timing signal indicating the beginning of a transmit data frame, said received-payload timing signal read out of said memory, and a pointer action request requesting a pointer adjustment in said transmit data frame, a transmit pointer for said transmit data frame and a clock synchronized to data within said transmit data frame for sequentially reading said payload from said memory, said clock being such that portions thereof other than the portions corresponding to said payload are inhibited in a clustered fashion, and for outputting said transmit pointer and said clock thus determined;

a transmit pointer appending block for appending said transmit pointer to said payload read out of said memory in accordance with said clusteringly inhibited clock output from said transmit pointer determining block;

a receiving-side PLL circuit for accepting at an input thereof a clock synchronized to said data within said receive data frame and containing selectively inhibited portions that are equal in number to portions of said data frame other than the portion of said payload contained therein, and for rearranging timings of said clock at substantially equally spaced intervals;

a transmitting-side PLL circuit for accepting at an input thereof a clock synchronized to said data within said transmit data frame and containing selectively inhibited portions that are equal in number to portions of said data frame other than the portion of said payload contained therein, and for rearranging timings of said clock at substantially equally spaced intervals; and a phase comparator circuit for performing a phase comparison between an output of said receiving-side PLL circuit and an output of said transmitting-side PLL circuit, and for outputting the result of said phase comparison as said pointer action request in said transmit data frame.

8. An apparatus according to claim 7, wherein said clock input to said receiving-side PLL circuit is the clusteringly inhibited clock output from said received-pointer interpretation block, and said clock input to said transmitting-side PLL circuit is the clusteringly inhibited clock output from said transmit pointer determining block.

9. An apparatus according to claim 7, further comprising:

a transmitting-side inhibit signal generating circuit for outputting temporally dispersed inhibit signals equal in number to said portions of said transmit data frame other than the portion of said payload contained therein; and a transmitting-side inhibit circuit for selectively inhibiting said clock synchronized to said data within said transmit data frame, in accordance with said transmitting-side inhibit signals, and for supplying said selectively inhibited clock to said transmitting-side PLL circuit.

10. An apparatus according to claim 7, further comprising:

a receiving-side inhibit signal generating circuit for outputting temporally dispersed inhibit signals equal in number to said portions of said received data frame other than the portion of said payload contained therein; and a receiving-side inhibit circuit for selectively inhibiting said clock synchronized to said data within said received data frame, in accordance with said receiving-side inhibit signals, and for supplying said selectively inhibited clock to said receiving-side PLL circuit.

11. A transmission apparatus for performing transmission using a data frame containing an overhead area and a payload area and capable of accommodating a payload in any part of said payload area by including in a designated location in said overhead area a pointer indicating the beginning of said payload accommodated in said payload area, comprising:

a received-pointer interpretation block for interpreting a received pointer contained in a received data frame, and for outputting a received-payload timing signal indicating the beginning of a payload and also outputting a clock that is synchronized to data within said received data frame and whose portions other than the portions thereof corresponding to said payload are inhibited in a clustered fashion;

a memory for sequentially storing said received-payload timing signal and said payload contained in said received data frame in response to said clusteringly inhibited clock output from said received-pointer interpretation block;

a transmit pointer determining block for determining, from a transmit data frame timing signal indicating the beginning of a transmit data frame, said received-payload timing signal read out of said memory, and a pointer action request requesting a pointer adjustment in said transmit data frame, a transmit pointer for said transmit data frame and a clock synchronized to data within said transmit data frame for sequentially reading said payload from said memory, said clock being such that portions thereof other than the portions corresponding to said payload are inhibited in a clustered fashion, and for outputting said transmit pointer and said clock thus determined;

a transmit pointer appending block for appending said transmit pointer to said payload read out of said memory in accordance with said clusteringly inhibited clock output from said transmit pointer determining block;

a receiving-side inhibit signal generating circuit for outputting temporally dispersed inhibit signals equal in number to said portions of said received data frame other than the portion of said payload contained therein;

a receiving-side inhibit circuit for selectively inhibiting said clock synchronized to said data within said received data frame, in accordance with said receiving-side inhibit signals, and for outputting said selectively inhibited clock;

transmitting-side inhibit signal generating circuit for outputting temporally dispersed inhibit signals equal in number to said portions of said transmit data frame other than the portion of said payload contained therein; and a transmitting-side inhibit circuit for selectively inhibiting said clock synchronized to said data within said transmit data frame, in accordance with said transmitting-side inhibit signals, and for outputting said selectively inhibited clock; and a phase comparator circuit for performing a phase comparison between the output of said receiving-side inhibit circuit and the output of said transmitting-side inhibit circuit, and for outputting the result of said phase comparison as said pointer action request in said transmit data frame.

12. A transmission apparatus for performing transmission using a data frame containing an overhead area and a payload area and capable of accommodating a payload in any part of said payload area by including in a designated location in said overhead area a pointer indicating the beginning of said payload accommodated in said payload area, comprising:

a received-pointer interpretation block for interpreting a received pointer contained in a received data frame, and for outputting a received-payload timing signal indicating the beginning of a payload and also outputting a clock that is synchronized to data within said received data frame and whose portions other than the portions thereof corresponding to said payload are inhibited in a clustered fashion;

a memory for sequentially storing said received-payload timing signal and said payload contained in said received data frame in response to said clusteringly inhibited clock output from said received-pointer interpretation block;

a transmit pointer determining block for determining, from a transmit data frame timing signal indicating the beginning of a transmit data frame, said received-payload timing signal read out of said memory, and a pointer action request requesting a pointer adjustment in said transmit data frame, a transmit pointer for said transmit data frame and a clock synchronized to data within said transmit data frame for sequentially reading said payload from said memory, said clock being such that portions thereof other than the portions corresponding to said payload are inhibited in a clustered fashion, and for outputting said transmit pointer and said clock thus determined;

a transmit pointer appending block for appending said transmit pointer to said payload read out of said memory in accordance with said clusteringly inhibited clock output from said transmit pointer determining block;

a phase comparator for performing a phase comparison between a clock synchronized to said received data frame and a clock synchronized to said transmit data frame, and for outputting the result of said phase comparison as a pointer action request occurring due to a frequency difference;

a first counter for calculating the period of said pointer action request occurring due to said frequency difference;

a second counter for calculating the period of pointer actions contained in said received data frame;

means for determining a pointer action period in said transmit data frame from the values of said periods output from said first and second counters; and a frequency divider for outputting said pointer action request in said transmit data frame with said determined period.

13. An apparatus according to claim 3, further comprising:

an incoming-side inhibit signal generating circuit for outputting temporally dispersed inhibit signals equal in number to said portions of said incoming data frame other than the portion of said payload contained therein; and an incoming-side inhibit circuit for selectively inhibiting said clock synchronized to said data within said incoming data frame, in accordance with said incoming-side inhibit signals, and for supplying said selectively inhibited clock to said incoming-side PLL circuit.

14. An apparatus according to claim 9, further comprising:

a receiving-side inhibit signal generating circuit for outputting temporally dispersed inhibit signals equal in number to said portions of said received data frame other than the portion of said payload contained therein; and a receiving-side inhibit circuit for selectively inhibiting said clock synchronized to said data within said received data frame, in accordance with said receiving-side inhibit signals, and for supplying said selectively inhibited clock to said receiving-side PLL circuit.

* * * * *